US012610343B2

(12) United States Patent
Wu et al.

(10) Patent No.: US 12,610,343 B2
(45) Date of Patent: Apr. 21, 2026

(54) UE-BASED POSITIONING USING SIDELINK COMMUNICATION

(71) Applicant: Apple Inc., Cupertino, CA (US)

(72) Inventors: Zhibin Wu, Los Altos, CA (US);
Dawei Zhang, Saratoga, CA (US);
Fangli Xu, Beijing (CN); Haijing Hu,
Los Gatos, CA (US); Jie Cui, San Jose,
CA (US); Srirang A. Lovlekar,
Fremont, CA (US); Weidong Yang, San
Diego, CA (US); Yuqin Chen, Beijing
(CN)

(73) Assignee: Apple Inc., Cupertino, CA (US)

( * ) Notice: Subject to any disclaimer, the term of this
patent is extended or adjusted under 35
U.S.C. 154(b) by 320 days.

(21) Appl. No.: 17/796,636

(22) PCT Filed: Sep. 3, 2021

(86) PCT No.: PCT/CN2021/116512
§ 371 (c)(1),
(2) Date: Jul. 29, 2022

(87) PCT Pub. No.: WO2023/028999
PCT Pub. Date: Mar. 9, 2023

(65) Prior Publication Data
US 2024/0188030 A1 Jun. 6, 2024

(51) Int. Cl.
*H04W 64/00* (2009.01)
*H04L 5/00* (2006.01)
*H04W 92/18* (2009.01)
(52) U.S. Cl.
CPC ......... *H04W 64/006* (2013.01); *H04L 5/0051*
(2013.01); *H04W 92/18* (2013.01)

(58) Field of Classification Search
CPC ............................ H04L 5/0051; H04W 92/18
USPC ...................................................... 455/456.1
See application file for complete search history.

(56) References Cited

U.S. PATENT DOCUMENTS

| | | | |
|---|---|---|---|
| 2011/0117925 A1 | 5/2011 | Sampath et al. | |
| 2019/0230477 A1* | 7/2019 | Yu | G01S 5/0236 |
| 2019/0230619 A1 | 7/2019 | Cui et al. | |
| 2020/0408871 A1 | 12/2020 | Da et al. | |
| 2022/0065978 A1* | 3/2022 | Manolakos | G01S 5/0236 |

(Continued)

FOREIGN PATENT DOCUMENTS

| | | |
|---|---|---|
| CN | 107852582 A | 3/2018 |
| CN | 109327901 A | 2/2019 |

(Continued)

OTHER PUBLICATIONS

International Patent Application No. PCT/CN2021/116512, International Preliminary Report on Patentability, Mar. 14, 2024, 5 pages.

(Continued)

*Primary Examiner* — Fabricio R Murillo Garcia
(74) *Attorney, Agent, or Firm* — Kilpatrick Townsend & Stockton LLP

(57) ABSTRACT

A method includes causing, at a first user equipment (UE), transmission of at least one positioning reference signal (PRS) to a second UE via a sidelink (SL) communication based on first positioning assistance data. The transmission enables the second UE to determine positioning measurements from at least part of the at least one PRS.

20 Claims, 10 Drawing Sheets

(56) References Cited

U.S. PATENT DOCUMENTS

| | | | | |
|---|---|---|---|---|
| 2022/0069960 A1* | 3/2022 | Bao | .................. | G01S 5/0072 |
| 2022/0321293 A1 | 10/2022 | Ren | | |
| 2022/0321294 A1 | 10/2022 | Ren et al. | | |
| 2023/0015004 A1* | 1/2023 | Wu | .................. | H04W 72/044 |
| 2023/0076043 A1* | 3/2023 | Manolakos | .......... | H04L 5/0023 |
| 2023/0309066 A1* | 9/2023 | Ganesan | .............. | H04W 72/02 |
| 2023/0319763 A1* | 10/2023 | Yerramalli | ........... | G01S 5/0236 |
| | | | | 455/456.1 |
| 2023/0403114 A1* | 12/2023 | Ko | .......................... | G01S 5/02 |
| 2024/0155546 A1* | 5/2024 | Dai | ...................... | H04L 5/0051 |

FOREIGN PATENT DOCUMENTS

| | | | |
|---|---|---|---|
| CN | 111093154 A | 5/2020 | |
| CN | 112055976 A | 12/2020 | |
| CN | 112601970 A | 4/2021 | |
| CN | 112788519 A | 5/2021 | |
| CN | 112955770 A | 6/2021 | |
| WO | 2015178830 A1 | 11/2015 | |
| WO | 2021057175 A1 | 4/2021 | |
| WO | 2021057232 A1 | 4/2021 | |

OTHER PUBLICATIONS

Discussion on On-Demand Reference Signals for Positioning, InterDigital Inc., 3GPP RAN WG2 Meeting #112-e, Nov. 13, 2020, 4 pages.

On-Demand DL-PRS, Qualcomm Incorporated, 3GPP TSG-RAN WG2 Meeting #115-e R2-2108384, Aug. 27, 2021, 7 pages.

International Patent Application No. PCT/CN2021/116512, International Search Report and Written Opinion, Mailed Apr. 26, 2022, 9 pages.

IEE Standard for Information technology—Telecommunications and information exchange between systems—Local and metropolitan area networks—Specification requirements, Part 11: Wireless LAN Medium Access Control (MAC) and Physical Layer (PHY) Specifications, Amendment 6: Wireless Access in Vehicular Environments, IEEE Computer System, Jul. 15, 2010, 51 pages.

3rd Generation Partnership Project; Technical Specification Group Radio Access Network; NR; NR and NG-RAN Overall Description; Stage 2 (Release 16), 3GPP TS 38.300 V16.6.0, Jun. 2021, 152 pages.

3rd Generation Partnership Project; Technical Specification Group Radio Access Network; NR; Medium Access Control (MAC) protocol specification (Release 16), 3GPP TS 38.321 V16.5.0, Jun. 2021, 157 pages.

3rd Generation Partnership Project; Technical Specification Group Radio Access Network; NR; Radio Resource Control (RRC) protocol specification (Release 16), 3GPP TS 38.331 V16.5.0, Jun. 2021, 959 pages.

3rd Generation Partnership Project; Technical Specification Group Radio Access Network; Study on scenarios and requirements of in-coverage, partial coverage, and out-of-coverage NR positioning use cases (Release 17), 3GPP TR 38.845 V1.0.1, Jun. 2021, 15 pages.

Views on study of sidelink based positioning in Rel. 18, 3rd Generation Partnership Project, RWS-210491, Radio Access Network REL-18 workshop, Jun. 28-Jul. 2, 2021, 12 pages.

European Patent Application No. 21955533.1, Extended European Search Report, Mar. 20, 2025, 13 pages.

On-Demand DL-PRS, 3rd Generation Partnership Project Technical Specification Group-Radio Access Network Working Group 2 Meeting #114-e, R2-2106084 Electronic, May 19-27, 2021, 10 pages.

China Patent Application No. 202180014144.0, Office Action, Aug. 1, 2025, 22 pages.

China Patent Application No. 202180014144.0, Office Action, Jan. 26, 2026, 12 pages.

* cited by examiner

500

600

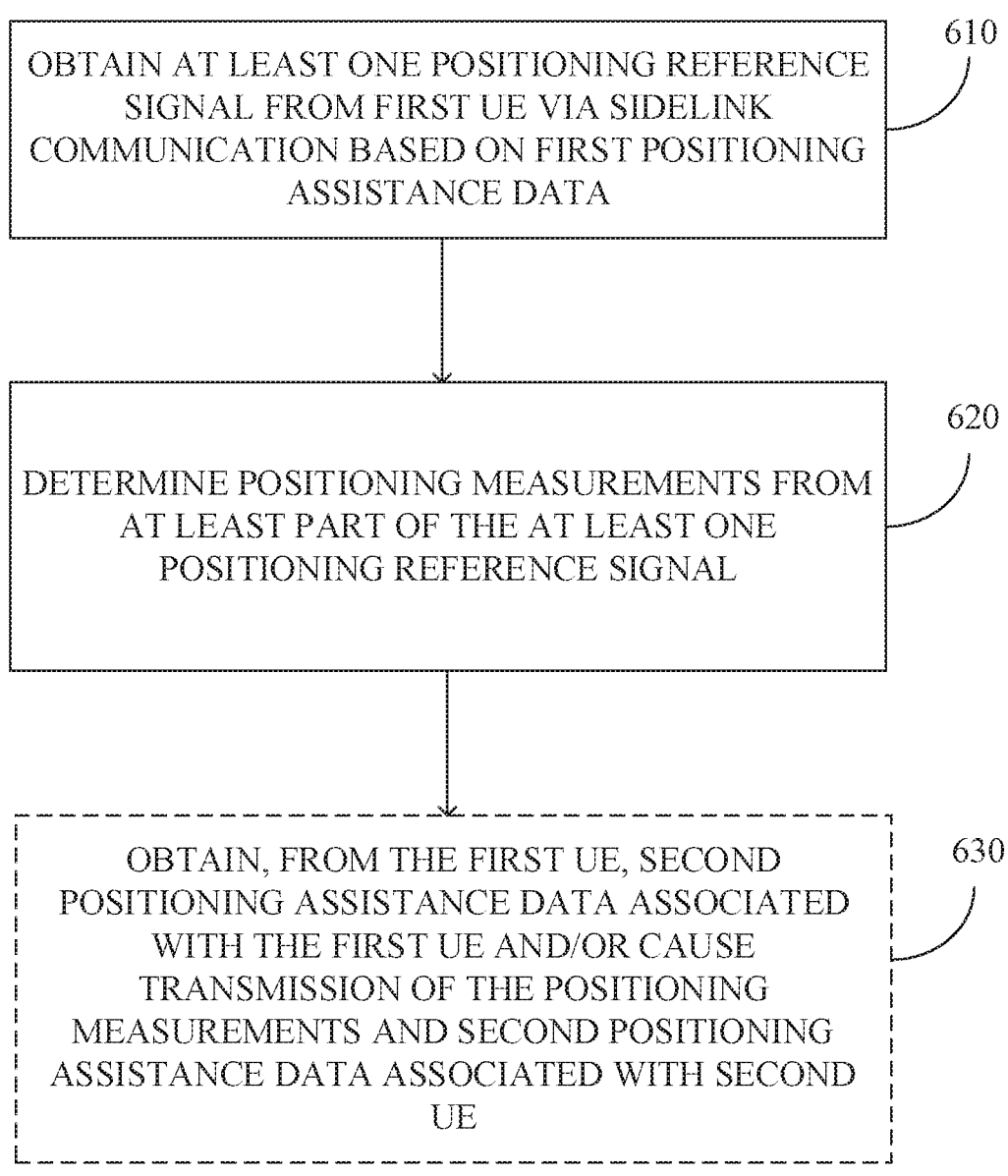

OBTAIN AT LEAST ONE POSITIONING REFERENCE SIGNAL FROM FIRST UE VIA SIDELINK COMMUNICATION BASED ON FIRST POSITIONING ASSISTANCE DATA — 610

DETERMINE POSITIONING MEASUREMENTS FROM AT LEAST PART OF THE AT LEAST ONE POSITIONING REFERENCE SIGNAL — 620

OBTAIN, FROM THE FIRST UE, SECOND POSITIONING ASSISTANCE DATA ASSOCIATED WITH THE FIRST UE AND/OR CAUSE TRANSMISSION OF THE POSITIONING MEASUREMENTS AND SECOND POSITIONING ASSISTANCE DATA ASSOCIATED WITH SECOND UE — 630

FIRST MODULE 710

SECOND MODULE 720

800

FIRST MODULE 810

SECOND MODULE 820

THIRD MODULE 830

UE-BASED POSITIONING USING SIDELINK COMMUNICATION

CROSS REFERENCE TO RELATED APPLICATION

This application is a 371 U.S. National Phase of PCT International Patent Application No. PCT/CN2021/116512, filed Sep. 3, 2021, which is herein incorporated by reference in its entirety for all purposes.

TECHNICAL FIELD

The present disclosure relates to the field of wireless communication, and more specifically, to user equipment (UE)-based sidelink positioning.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANS, RAN Nodes can include a 5G Node, new radio (NR) node or g Node B (gNB), which communicate with a wireless communication device, also known as user equipment (UE).

In a typical UE in road environment, a UE may be in communication with one or more of Global Navigation Satellite System (GNSS) satellites, base stations, moving objects nearby (e.g., a peer UE(s)), or Road Side Units (RSUs). UE can communicate with another UE via Sidelink interface, and communicate with base station in Uu interface as well. RSU can be either a Sidelink capable UE or a base station.

SUMMARY

According to some embodiments of the present disclosure, a method is provided comprising: causing, at a first user equipment (UE), transmission of at least one positioning reference signal (PRS) to a second UE via a sidelink (SL) communication based on first positioning assistance data, wherein the transmission enables the second UE to determine positioning measurements from at least part of the at least one PRS.

According to some embodiments of the present disclosure, a method is provided comprising: obtaining, at a second user equipment (UE), at least one positioning reference signal (PRS) from a first UE via a sidelink communication based on first positioning assistance data; and determining, at the second UE, positioning measurements from at least part of the at least one PRS.

According to some embodiments of the present disclosure, an apparatus for a user equipment (UE) is provided. The apparatus comprises one or more processors configured to perform any of the methods as described above.

According to some embodiments of the present disclosure, a computer readable medium having computer programs stored thereon is provided. The computer programs when executed by an apparatus having one or more processors, cause the apparatus to perform any of the methods as described above.

According to some embodiments of the present disclosure, a computer program product is provided. The computer program product comprises computer programs which, when executed by an apparatus having one or more processors, cause the apparatus to perform any of the methods as described above.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 6 is a flow chart illustrating a method performed at a second UE in accordance with some embodiments.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE).

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IOT) device, etc.) used by a user. In this context, the term "wireless communication device" may further refer to a vehicle in the sense that a vehicle is generally capable of wireless communication, which is especially true in the era of autonomous driving. The term "vehicle" or other similar terms used herein generally includes motor vehicles, such as passenger vehicles including cars, sport utility vehicles (SUVs), buses, large trucks, various commercial vehicles, including various boats, ships, vessels, aircraft, etc., and includes hybrid vehicles, electric vehicles, plug-in hybrid electric vehicles, hydrogen-powered vehicles, and other alternative fuel vehicles (for example, fuel derived from sources other than petroleum). A UE may be mobile or may (e.g., at certain times) be stationary, and may communicate with a Radio Access Network (RAN).

As used herein, the term "and/or" or "at least one of" includes any and all combinations of one or more of the associated listed items. The terms "position" and "location" can be used herein interchangeably.

Device to Device (D2D), also known as Sidelink (SL), is an important branch of Internet of Thing (IOT) technology. D2D technology mainly includes two functions. One is the D2D discovery function, which enables user equipment to discover each other in the near field. The other is the D2D communication function, which allows user equipment to directly transmit data without passing through the base station. The base station may still be responsible for resource coordination and/or security management and control.

The Inventor(s) recognized that sidelink communications may be exploited to facilitate UE-based positioning, for example, vehicle positioning in autonomous driving. Sidelink positioning can also be used in other environments, such as home, retail store, disaster rescue area. For example, in home environment, the UE can communicate with other UEs embedded in home electronics (TV, microwave oven, light switch, etc.) and determine the relative distance among the devices and trigger corresponding "smart" operations based on the distance measurement.

Figure 1:
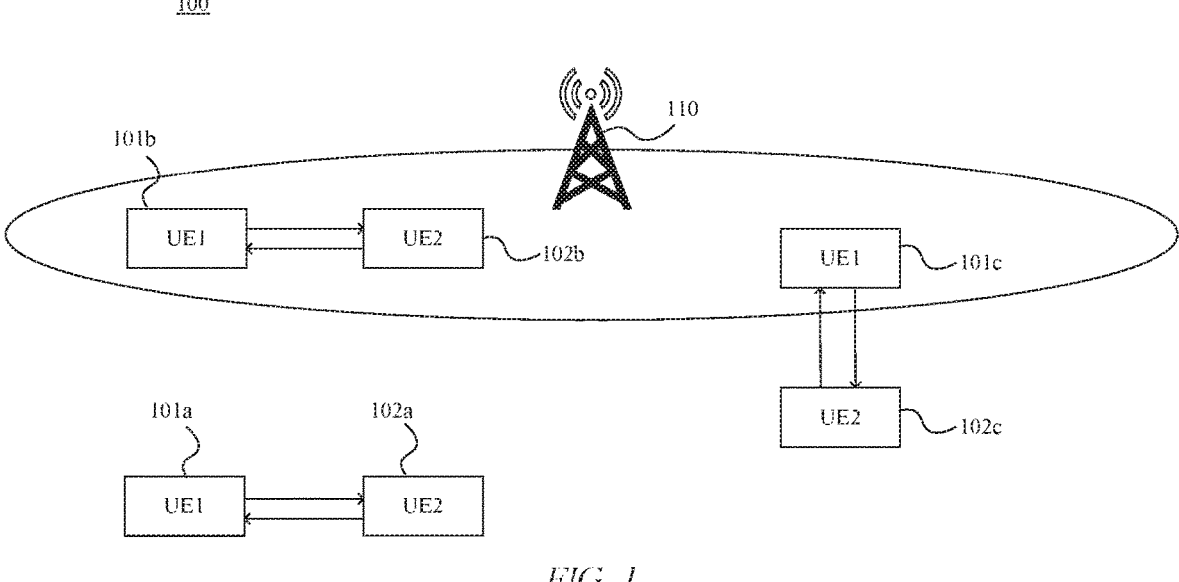
FIG. 1 is a schematic diagram illustrating a wireless communication network in which embodiments herein may be implemented.

FIG. 1 illustrates a wireless communication network 100 in accordance with some embodiments. The wireless communication network 100 includes a first UE and a second UE that are in sidelink communication with each other. In this example, the first UE has three instances, 101a, 101b and 101c (collectively referred to as "first UE 101" hereinafter), and the second UE also has three instances, 102a, 102b and 102c (collectively referred to as "second UE 102" hereinafter). The wireless communication network 100 may further include a base station 110, which may be responsible for resource coordination and/or security management and control in some cases.

In the example of FIG. 1, the first UE 101a and the second UE 102a are out of radio coverage of the base station 110. The first UE 101b and the second UE 102b are within radio coverage of the base station 110. The first UE 101c is within radio coverage of the base station 110, while the second UE 102c are out of radio coverage of the base station 110. In either case, methods for UE-based sidelink positioning described herein may be implemented.

Figure 2:
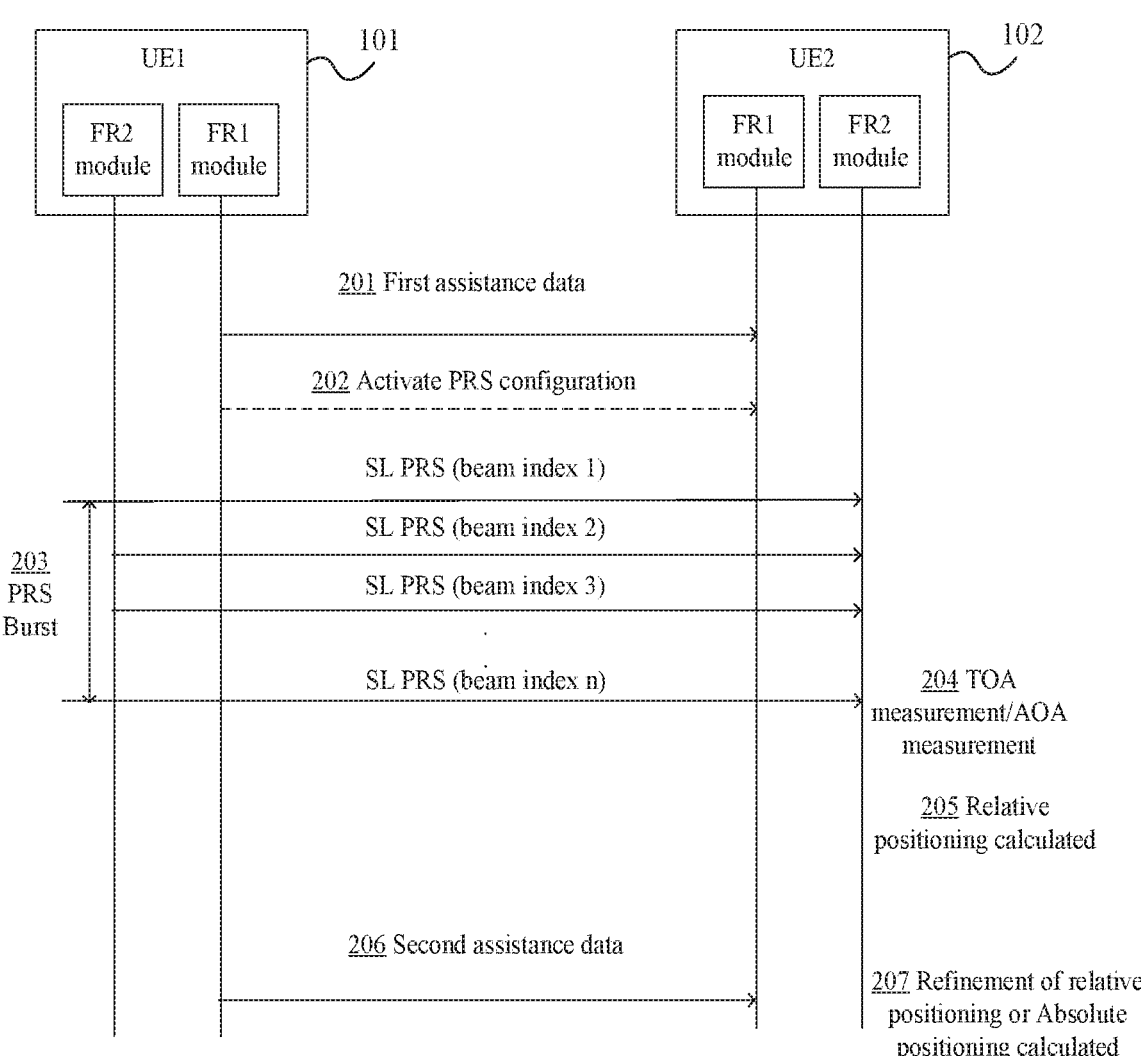
FIG. 2 is a signaling diagram illustrating an example of a method in accordance with some embodiments.

FIG. 2 is a signaling diagram illustrating an example of a method in accordance with some embodiments. In this example, each of the first and second UEs 101 and 102 includes a frequency range one (FR1) module (e.g., a FR1 transceiver) and a frequency range two (FR2) module (e.g., a FR2 transceiver). The frequency ranges FR1 and FR2 are defined in 5G spectrum, with FR1 ranging from 450 MHz to 6000 MHz (which is usually referred to as Sub-6 Ghz), and FR2 ranging from 24250 MHz to 52600 MHz (which is usually referred to as millimeter waves).

Although not shown, the method may in some embodiments include a step where the first UE 101 and the second UE 102 establish SL communication with each other and exchange their respective capabilities of positioning-related measurement. By having knowledge of the capability of each other, the positioning operations that follow may be facilitated.

At step 201, the first UE 101, which acts as a transmitting UE, transmits first positioning assistance data via its FR1 module to the second UE 102 which acts as a receiving UE, and the first positioning assistance data is then received by the second UE 102 via its FR1 module. The first positioning assistance data is designed to announce or convey a configuration of sidelink positioning reference signal (SL-PRS), which SL-PRS is transmitted to the second UE 102 to enable the positioning-related measurements in the second UE 102, as will be described later. In one example, the first UE 101 may use Radio Resource Control (RRC) protocol (e.g., PC5-RRC) to announce or convey its configuration of SL-PRS. If PC5-RRC is used, the SL PRS configuration (and other assistance data) can be exchanged between UE 101 and UE 102 in a PC5 unicast connection. Moreover, SL broadcast in PC5-Control Plane may be enhanced to support broadcast of the positioning assistance data, as part of PCR-RRC broadcasting signaling. It is also possible to use the groupcast to announce or convey the SL-PRS configurations and other assistance data to a group of UEs (e.g., vehicles in a vehicle platoon). In another example, a new upper layer protocol may be designed for the first UE 101 to announce or convey its configuration of SL-PRS.

In some embodiments, the first positioning assistance data may include one or more parameters related to availability of the SL-PRS. In one example, such parameters may include at least one of:

Start/end time of SL-PRS transmission

ON/OFF indicator of the SL-PRS (this indicator can be used for on-demand triggering of the SL-PRS transmission, for example).

In some embodiments, the first positioning assistance data may include one or more parameters to identify a carrier frequency for the transmission of the SL-PRS. In one example, such parameters may include:

SL-PRS absolute frequency.

In some embodiments, the first positioning assistance data may include one or more parameters to identify one or more resource pools for transmission/receipt of the SL-PRS. In one example, such parameters may include:

SL-PRS resource pool ID(s).

In some embodiments, the first positioning assistance data may include one or more parameters to describe how one or more resources are organized in the one or more resource pools. In one example, such parameters may include at least one of:

SL-PRS resource ID(s)

SL-PRS resource set ID(s)

Number of SL-PRS resources per SL-PRS resource set

These parameters may be stand-alone (i.e., applicable across all resource pools), or may be applicable on a per-pool basis.

In some embodiments, the first positioning assistance data may include one or more parameters to identify each resource for transmission/receipt of the SL-PRS. In one example, such parameters may include at least one of:

SL-PRS Start PRB

SL-PRS Resource Bandwidth.

In some embodiments, the first positioning assistance data may include one or more parameters to define how each transmission of the SL-PRS uses the resources. In one example, such parameters may include at least one of:

Number of SL-PRS frequency layers

SL-PRS frequency layer indicator

SL-SRS Subcarrier Spacing

SL-PRS Comb Size

SL-PRS Cyclic Prefix

Number of SL-PRS Resource Symbols per SL-PRS resource

SL-PRS Resource Tx Power.

In some embodiments, the first positioning assistance data may include one or more parameters related to how the SL-PRS (resource) is repeated in time domain. In one example, such parameters may include at least one of:

SL-PRS Periodicity (used for SP/P configuration)

SL-PRS ResourceSlotOffset or SL-PRS ResourceSetSlotOffset

The parameter "SL-PRS Periodicity" may be used for periodic mode or semi-persistent mode. These two modes will be further described later.

In some embodiments, the first positioning assistance data may include one or more parameters to identify one or more transmitters of the SL-PRS. In one example, such parameters may include at least one of:

TxRxPoint (TRP) ID (this can be used if multiple antennas are spatially placed by a UE (e.g., a vehicle UE has Tx antennas in front and rear bumper), in which case the configurations may need to be per TRP.)

This can also be used if multiple Sidelink UEs are coordinated to transmit the SL-PRS and the positioning assistance data of those UEs are combined.

In some embodiments, the first positioning assistance data may include one or more parameters to identify a transmission mode for the transmission of the SL-PRS. In one example, there are three modes for SL-PRS transmission, which are periodic mode, one-shot mode (also called as aperiodic mode), and semi-persistent mode.

In the periodic mode, the transmitting UE periodically transmits the SL-PRS on its own regardless of whether or not there is a receiving UE. In the one-shot mode, the transmitting UE designates a time for SL-PRS transmission and transmits the SL-PRS in one shot at the designated time, and the receiving UE receives the SL-PRS at the designated time. In the semi-persistent mode, the transmitting UE informs the receiving UE to activate and deactivate a predetermined configuration for receipt of the SL-PRS. For example, in step 202 the first UE 101 informs the second UE 102 to activate a previously announced or conveyed semi-persistent configuration. Then after the SL-PRS is transmitted by the first UE 101 and received by the second UE 102, the first UE 101 informs the second UE 102 to deactivate the semi-persistent configuration. This deactivation step is not shown in FIG. 2 for simplification of the illustration. In one example, the first UE 101 may use Media Access Control (MAC) Control Element (CE) to activate/deactivate the semi-persistent configuration in the second UE 102. It will be understood that step 202 is not necessary in the periodic mode or one-shot mode.

At step 203, the first UE 101 transmits the SL-PRS via its FR2 module and the second UE 102 receives the SL-PRS via its FR2 module. In this example, the SL-PRS includes a plurality of directional beams. The plurality of directional beams can be indexed with indices 1 to n, respectively, and transmitted in a burst mode in which the beams 1 to n may be regarded as being transmitted in substantially the same time. In this case of beam-sweeping, the first positioning assistance data transmitted from the first UE 101 to the second UE 102 in step 201 may further include one or more beam-related parameters for transmission/receipt of the SL-PRS to enable beam-level measurement of the SL-PRS by the second UE 102. In one example, such parameters may include at least one of:

Beam directions

Angel-related parameter (angle measurement window (how wide the beam is) etc.)

SL-PRS Quasi Co-Location (QCL) information.

In another example, the SL-PRS may be an omni-directional beam. The omni-directional beam may be used in, for example, a scenario of many-to-one positioning where there are multiple (e.g., three) transmitting UEs and one receiving UE. For example, the receiving UE may measure respective distances to the multiple transmitting UEs and derive its position relative to the multiple transmitting UEs from the distance measurements.

At step 204, the second UE 102 performs positioning-related measurements, for example, time of arrival (ToA) measurement, angle of arrival (AoA) measurement and/or signal strength measurement, based on the received SL-PRS. By ToA measurement the relative distance of the second UE 102 from the first UE 101 can be determined. By AoA measurement the angular position of the second UE 102 relative to the first UE 101 can be determined. In one example, the second UE 102 determines the AoA by finding the best receiving beam index and then determines its angular position relative to the first UE 101. By signal strength measurement the relative distance of the second UE 102 from the first UE 101 can be derived. The signal strength of the received SL-PRS can be translated back to the path loss and eventually the distance between the transmitting and receiving UEs.

At step 205, the second UE 102 calculates its relative position to the first UE 101 according to the measurements determined at step 204. With the relative distance and angular position determined, the relative position of the second UE 102 with respect to the first UE 101 can be calculated.

At step 206, the first UE 101 transmits second positioning assistance data associated with the first UE 101 via its FR1 module to the second UE 102 and the second UE 102 receives the second positioning assistance data via its FR1 module. The second positioning assistance data is designed to enable the transmitting UE to announce or convey assistance information for its PRS transmission to help the receiving UE to derive an absolute location or refine its relative positioning results. In one example, the second positioning assistance data associated with the first UE 101 may include a location and speed of the first UE 101 when transmitting the SL-PRS. As mentioned earlier, the second positioning assistance data may be transmitted using the PC5-RRC protocol, although this is not necessary.

At step 207, the second UE 102 performs refinement of relative positioning or calculates absolute positioning based on the relative positioning obtained in step 205 and the second positioning assistance data received in step 206.

It will be appreciated that steps 205 to 207 may be optional in some embodiments. It will further be appreciated that although the first and second positioning assistance data are shown in FIG. 2 as transmitted to the receiving UE in separate messages (in steps 201 and 206, respectively), the present disclosure is not limited thereto. In some embodiments, the first and second positioning assistance data may be transmitted in the same message, for example, in step 201.

Figure 3:
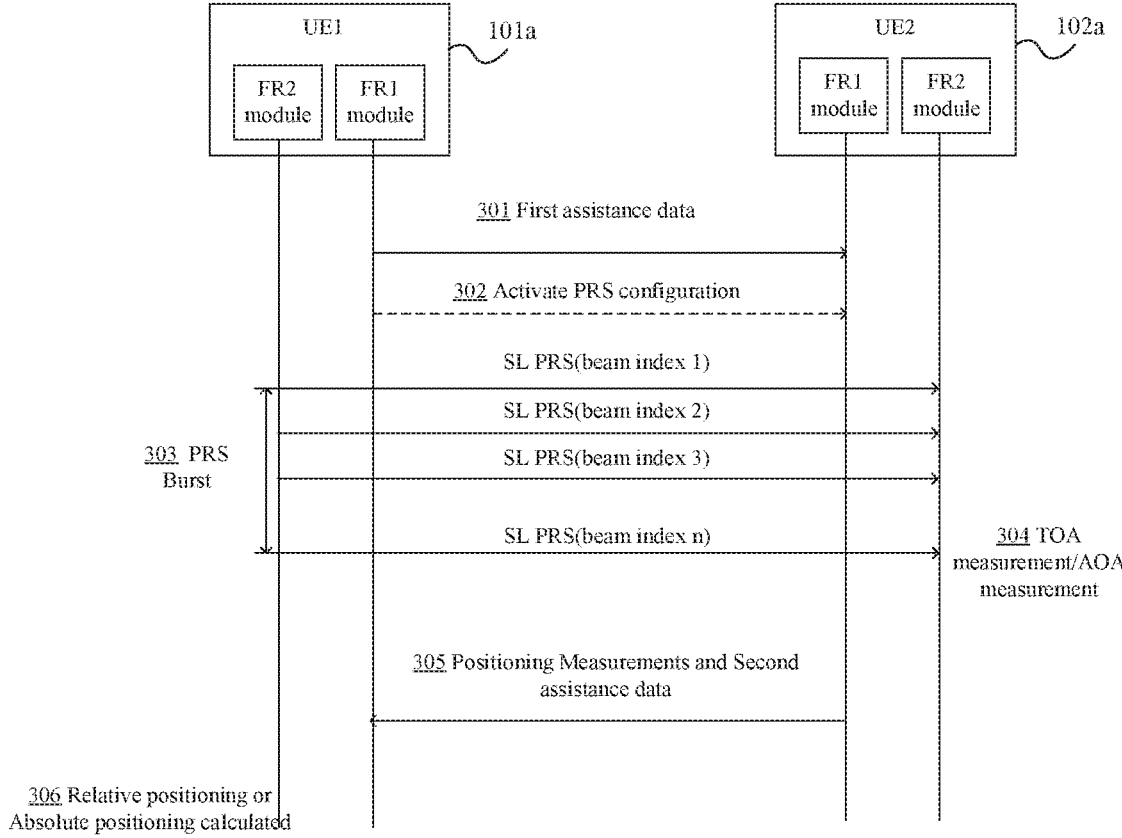
FIG. 3 is a signaling diagram illustrating an example of a method in accordance with some embodiments.

FIG. 3 is a signaling diagram illustrating an example of a method in accordance with some embodiments. This example is different from that described above with respect to FIG. 2 in that each of the first and second UEs 101 and 102 now acts as both a transmitting UE and a receiving UE. Steps 301 to 304 may still be similar to steps 201 to 204.

At step 301, the first UE 101 transmits the first positioning assistance data via its FR1 module to the second UE 102, and the first positioning assistance data is then received by the second UE 102 via its FR1 module.

In the case of semi-persistent mode, in step 302, the first UE 101 informs the second UE 102 to activate a previously announced or conveyed semi-persistent configuration. Then after the SL-PRS is transmitted by the first UE 101 and received by the second UE 102, the first UE 101 informs the second UE 102 to deactivate the semi-persistent configuration. This deactivation step is not shown in FIG. 3 for simplification of the illustration.

At step 303, the first UE 101 transmits the SL-PRS via its FR2 module and the second UE 102 receives the SL-PRS via its FR2 module. In this example, the SL-PRS includes a plurality of directional beams indexed with indices 1 to n.

At step 304, the second UE 102 performs positioning-related measurements, for example, time of arrival (ToA) measurement, angle of arrival (AoA) measurement and/or signal strength measurement, based on the received SL-PRS. In one example, the second UE 102 determines the AoA by finding the best receiving beam index and then determines its angular position relative to the first UE 101. In another example, the second UE 102 may not determine the best receiving beam index but send back the raw AoA measurements to the first UE 101, and the first UE 101 will then determine the best beam from the raw AoA measurements obtained from the second UE 102.

Figure 4:
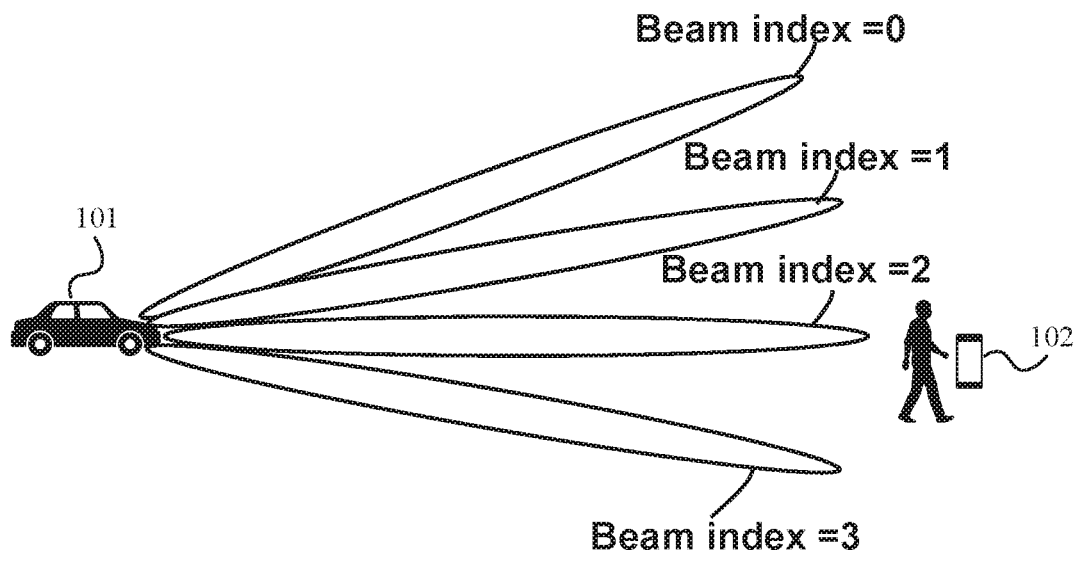
FIG. 4 is a schematic diagram illustrating an example of beam sweeping performed in the method of FIG. 3 in accordance with some embodiments.

Sending the positioning measurements back to the first UE 101 may be useful for some cases, for example, where the second UE 102 has limited computing capacity or where there is no need for the second UE 102 to know its relative position to the first UE 101. FIG. 4 shows an example where the first UE 101 is a vehicle and the second UE 102 is a mobile phone held by a pedestrian. In this case, it makes sense for the second UE 102 to send back the positioning measurements to the first UE 101 so that the first UE 101 can do the calculation of absolute or relative positioning to the second UE 102.

At step 305, the second UE 102, now acting as a transmitting UE, transmits the positioning measurements (e.g., ToA measurement and/or AoA measurement) and the second assistance data (e.g., a location and a speed of the second UE when determining the positioning measurements) via its FR1 module to first UE 101. The first UE 101, now acting as a receiving UE, receives the positioning measurements and the second positioning assistance data from the second UE 102. Since each of the first and second UEs 101 and 102 may act as both a transmitting UE and a receiving UE, some additional positioning methods may, in some embodiments, be used alternatively or additionally to the ToA method, the AoA method and the signal strength method. For example, Round Trip Time (RTT) may be measured by combing the mutual measurements of the two UEs. The RTT method may be more robust as it is not skewed by timing drifts between the UEs.

At step 306, the first UE 101 performs the calculation of absolute or relative positioning to the second UE 102. For example, the first UE 101 may calculate its relative position to the second UE 102 based on the positioning measurements obtained from the second UE 102. Additionally, the first UE 101 may, in some embodiments, calculate its absolute position based on the calculated relative position and the second assistance data (e.g., the location of the second UE 102) obtained from the second UE 102. In some embodiments, the first UE 101 can calculate the second UE 102's absolute positioning, based on the knowledge of its own absolute position and the calculated relative position between those two UEs. However, it will be appreciated that steps 305 to 306 may be optional in some embodiments.

In the example embodiments described above in connection with FIGS. 2 and 3, frequency range FR1 is used to transmit the positioning assistance data (including the first and second positioning assistance data) and frequency range FR2 is used to transmit the PRS signals. This may be based on the considerations as follows:

On one hand, FR2 has a large band-width which can carry wide-band signals and facilitate precise ToA measurements. Otherwise, using large frequency chunk in FR1 to transmit the PRS signals would cost band-width to transmit user plane data. Moreover, FR2 supports beam-sweeping, which helps to detect the angle-of-arrival of the PRS signals, providing a new dimension of measurements as compared to broadcast signals (e.g., in sub-6 GHZ band). In addition, FR2 can provide a large sub-carrier spacing (SCS) and short symbol length to cover the transmission of PRS bursts in multiple directions in a short time period, thus resulting in an improved measurement precision.

On the other hand, some positioning assistance information (e.g., the location and speed of the transmitting UE) are part of a Basic Safety Message (BSM) and BSM messages are supposed to be broadcast in frequency range FR1 (e.g., Band 47 in 5.9 GHZ). Furthermore, repeating the positioning assistance information in otherwise every directional beam is too costly. In addition, there are cases where some UEs (e.g., UEs of certain road users) can support a receive-only mode in FR2 to reduce complexity and cost, in which case transmitting the assistance data in FR1 would be infeasible.

The present disclosure is, however, not so limited. In some embodiments, different SL carrier frequency/bands other than FR1 and FR2 can be used to transmit the positioning assistance data and the PRS signals, respectively. In some embodiments, the same SL carrier frequency/band can be used to transmit both the positioning assistance data and the PRS signals.

Figure 5:
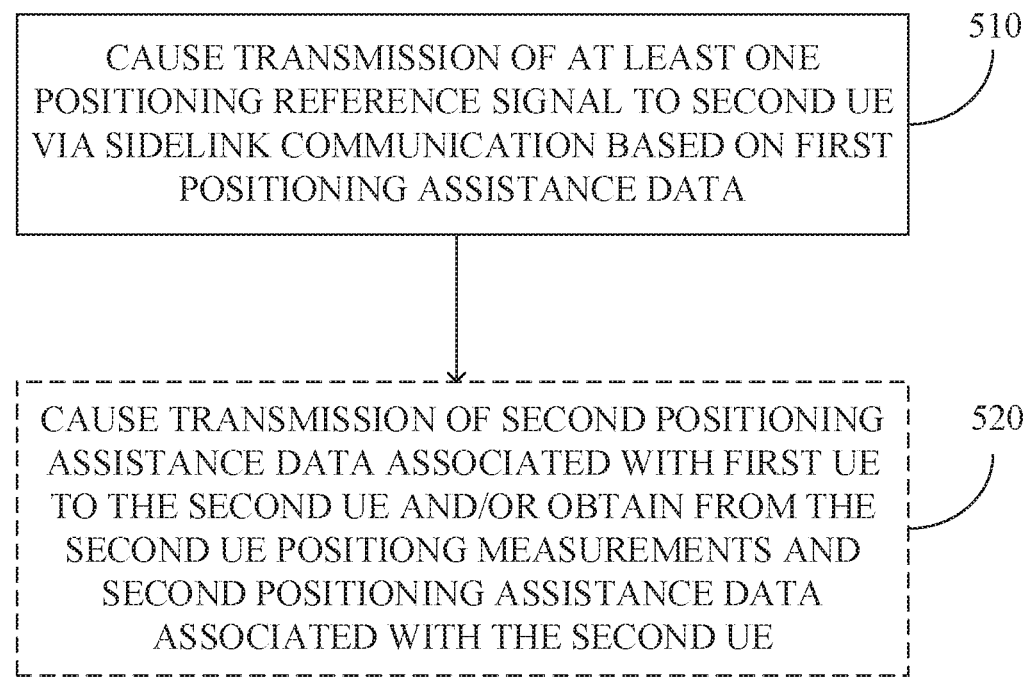
FIG. 5 is a flow chart illustrating a method performed at a first UE in accordance with some embodiments.

FIG. 5 is a flow chart illustrating a method 500 performed at the first UE 101 in accordance with some embodiments.

At step 510, the first UE 101 causes transmission of at least one SL-PRS (e.g., an omni-direction beam or a plurality of directional beams) to the second UE 102 via an SL communication based on the first positioning assistance data. As described above, the transmission of the SL-PRS enables the second UE 102 to determine positioning measurements (e.g., ToA measurement, AoA measurement, signal strength measurement, and/or RTT measurement) from at least part of the at least one PRS.

In some embodiments, for example, where the first UE 101 (e.g., UE 101a in FIG. 1) is out of radio coverage of the base station (e.g., base station 110 in FIG. 1), the UE1 101a may determine the first positioning assistance data by itself and transmits it to the second UE 102a. In one example, the first positioning assistance data may be determined by the first UE 101a adopting or modifying positioning assistance information pre-configured in the first UE 101a by, for example, a network operator or a UE manufacturer. In another example, the first UE 101*a* may start from scratch to determine the first positioning assistance data without using any pre-configured assistance information.

According to some embodiments, for example, where the first UE 101 (e.g., UE 101*b* in FIG. 1) is within radio coverage of the base station (e.g., base station 110 in FIG. 1), some or all of the first positioning assistance data may be configured by the base station 110 into the first UE 101*b*. Likewise, some or all of the first positioning assistance data may be configured by the base station 110 into the second UE 102*b*. In one example, the base station 110 (e.g., a gNB) configures UE-specific SL-PRS configurations. This may reduce collisions and interferences by the gNB coordinating the transmission of the SL-PRS. In another example, cell-specific configuration may be done which is common to all UEs in the cell.

According to some embodiments, for example, where the first UE 101 (e.g., UE 101*c* in FIG. 1) is within radio coverage of the base station (e.g., base station 110 in FIG. 1) but the second UE 102 (e.g., UE 102*c* in FIG. 1) is out of radio coverage of the base station 110, some or all of the first positioning assistance data may be configured by the base station 110 into the first UE 101*c*. Then the first UE 101*c* may transmit the first positioning assistance data which is obtained from the base station 110 to the second UE 102*c*.

In either case, the first UE 101 and the second UE 102 may be pre-configured with at least part of the first positioning assistance data by a network operator and/or a UE manufacturer. The pre-configured positioning assistance data may be the positioning assistance information that tends to remain static over time.

At step 520, the first UE 101 causes transmission of the second positioning assistance data associated with the first UE 101 to the second UE 102 for positioning of the second UE 102 (in the case of FIG. 2, for example). Alternatively or additionally, the first UE 101 obtains, from the second UE 102, the positioning measurements and the second positioning assistance data associated with the second UE 102 for positioning of the first UE 101 (in the case of FIG. 3, for example). It will be appreciated that step 520 may be optional in some embodiments.

FIG. 6 is a flow chart illustrating a method 600 performed at the second UE 102 in accordance with some embodiments.

At step 610, the second UE 102 obtains at least one SL-PRS (e.g., an omni-direction beam or a plurality of directional beams) from the first UE 101 via an SL communication based on the first positioning assistance data.

At step 620, the second UE 102 determines the positioning measurements (e.g., ToA measurement, AoA measurement, signal strength measurement, and/or RTT measurement) from at least part of the at least one PRS.

At step 630, the second UE 102 obtains, from the first UE 101, the second positioning assistance data associated with the first UE 101 for positioning of the second UE 102 (in the case of FIG. 2, for example). Alternatively or additionally, the second UE 102 causes transmission of the positioning measurements and the second positioning assistance data associated with the second UE 102 to the first UE 101 for positioning of the first UE 101 (in the case of FIG. 3, for example). It will be appreciated that step 630 may be optional in some embodiments.

According to some embodiments, the second UE 102 determines a position of the second UE 102 relative to the first UE 101 from the positioning measurements.

According to some embodiments, the second UE 102 determines a refined relative position or an absolute position of the second UE 102 from the determined position of the second UE 102 and the obtained second positioning assistance data associated with the first UE 101.

Figure 7:
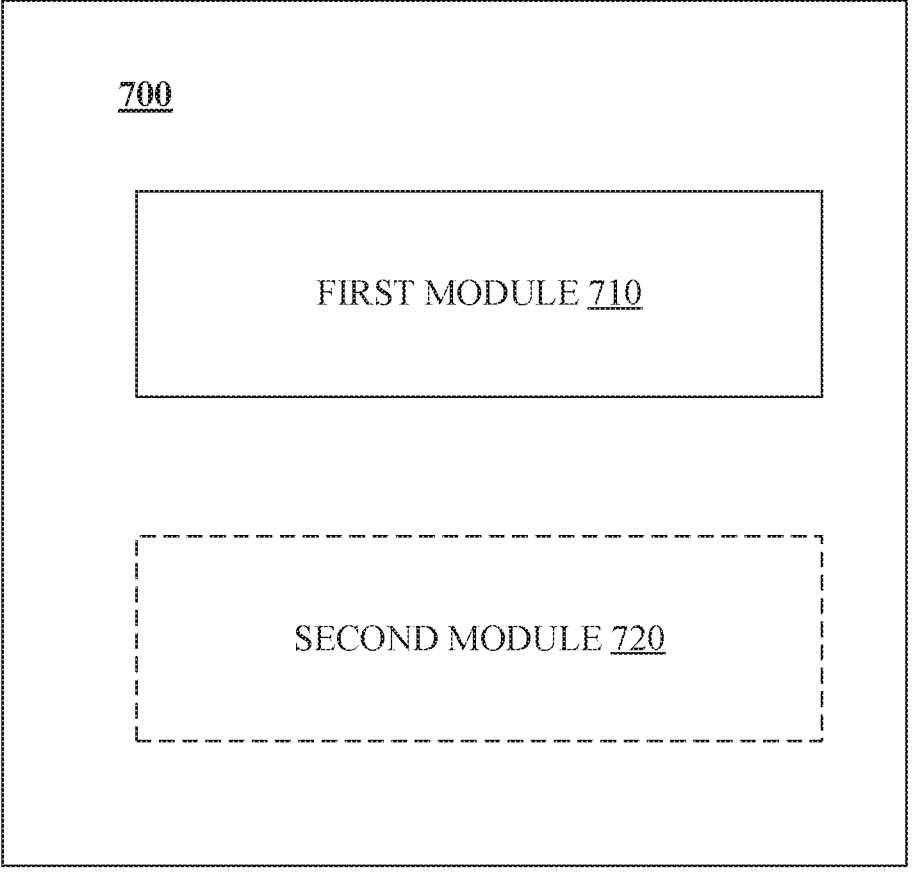
FIG. 7 is block diagram illustrating an example apparatus for the first UE in accordance with some embodiments.

FIG. 7 illustrates a block diagram of an example apparatus 700 for the first UE 101 in accordance with some embodiments. The apparatus 700 illustrated in FIG. 7 may be used to implement the method 500 as illustrated in combination with FIG. 5.

The apparatus 700 may include a first module 710 and a second module 720.

The first module 710 may be configured to cause, at the first UE 101, transmission of at least one PRS to the second UE 102 via an SL communication based on the first positioning assistance data. The transmission enables the second UE 102 to determine positioning measurements from at least part of the at least one PRS.

The second module 720 may be configured to perform, at the first UE 101, at least one selected from a group consisting of: causing transmission of the second positioning assistance data associated with the first UE 101 to the second UE 102 for positioning of the second UE 102; and obtaining, from the second UE 102, the positioning measurements and the second positioning assistance data associated with the second UE 102 for positioning of the first UE 101. It will be appreciated that the second module 720 may be optional in some embodiments.

Figure 8:
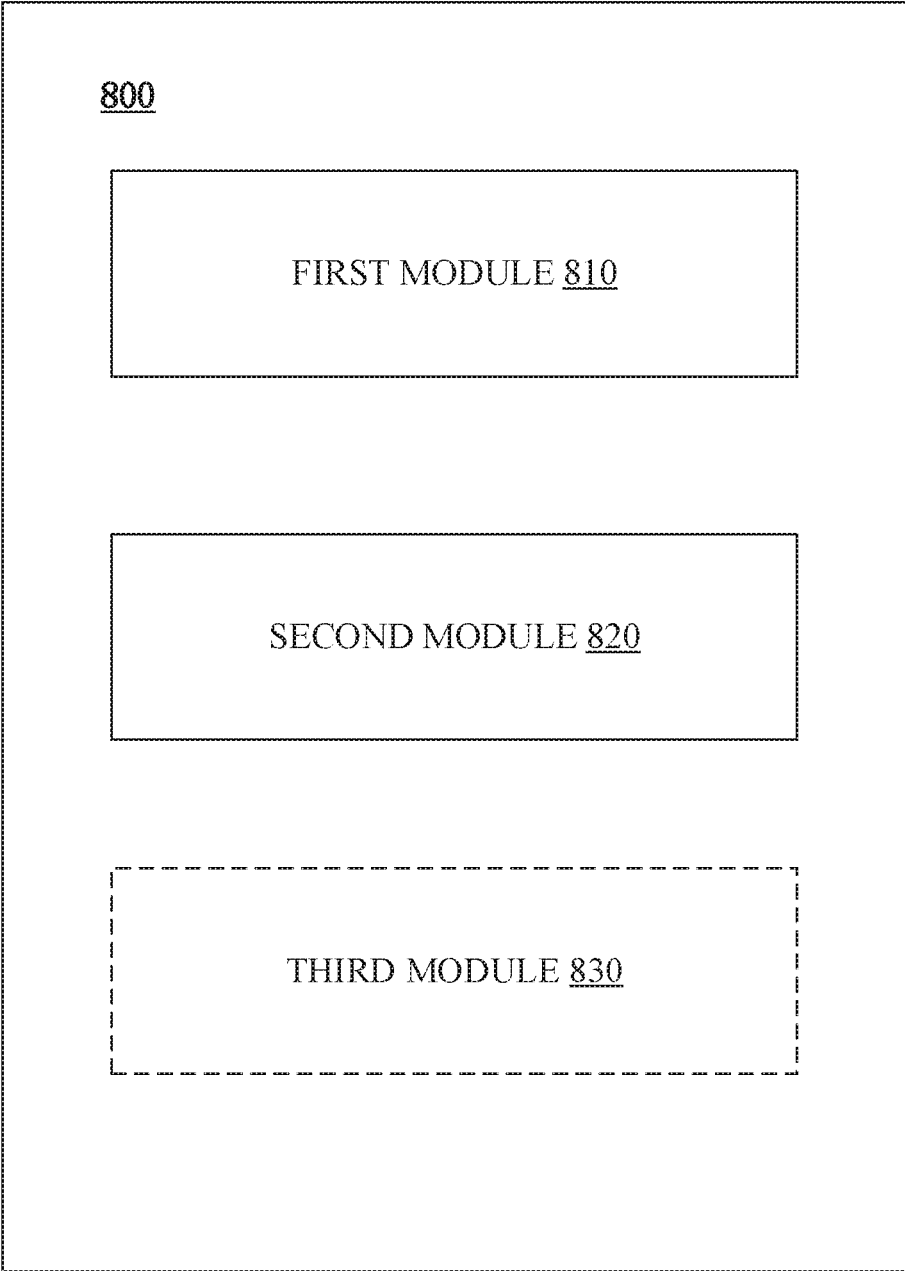
FIG. 8 is block diagram illustrating an example apparatus for the second UE in accordance with some embodiments.

FIG. 8 illustrates a block diagram of an example apparatus 800 for the second UE 102 in accordance with some embodiments. The apparatus 800 illustrated in FIG. 8 may be used to implement the method 600 as illustrated in combination with FIG. 6.

The apparatus 800 may include a first module 810, a second module 820 and a third module 830.

The first module 810 may be configured to obtain, at the second UE 102, at least one PRS from the first UE 101 via an SL communication based on the first positioning assistance data.

The second module 820 may be configured to determine, at the second UE 102, the positioning measurements from at least part of the at least one PRS.

The third module 830 may be configured to perform, at the second UE 102, at least one selected from a group consisting of: obtaining, from the first UE 101, the second positioning assistance data associated with the first UE 101 for positioning of the second UE 102; and causing transmission of the positioning measurements and the second positioning assistance data associated with the second UE 102 to the first UE 101 for positioning of the first UE 101. It will be appreciated that the third module 830 may be optional in some embodiments.

It should be understood that the modules of the apparatus 700 shown in FIG. 7 may correspond to the steps in the method 500 described with reference to FIG. 5, and the modules of the apparatus 800 shown in FIG. 8 may correspond to the steps in the method 600 described with reference to FIG. 6. Thus, the operations, features, and advantages described above for the methods 500 and 600 apply to the apparatuses 700 and 800, respectively. For the sake of brevity, some operations, features and advantages will not be repeated here.

Although specific functions have been discussed above with reference to specific modules, it should be noted that the functions of each module discussed herein may be divided into multiple modules, and/or at least some functions of multiple modules may be combined into a single module. The specific module execution action discussed herein includes the specific module itself performing the action, or alternatively the specific module calls or otherwise accesses another component or module that performs the action (or performs the action in conjunction with the specific module). Therefore, a specific module that performs an action may include the specific module itself that performs the action and/or another module that is called or accessed by the specific module to perform the action.

It should also be understood that various techniques may be described herein in the general context of software hardware elements or program modules. The various modules described above with respect to FIGS. 7 and 8 may be implemented in hardware or in hardware combined with software and/or firmware. For example, these modules may be implemented as computer program codes/instructions configured to be executed in one or more processors and stored in a computer-readable storage medium. Alternatively, these modules can be implemented as hardware logic/circuitry.

It will be appreciated that although the embodiments are described herein in connection with a scenario of one-to-one positioning, they are applicable to a scenario of many-to-one positioning. Many-to-one positioning can be used to refine the positioning results in that it can provide spatial diversity (having multiple transmitters of SL-PRS in different locations) and temporal diversity (having the same transmitter transmitting at different time (at same or different locations)).

Figure 9:
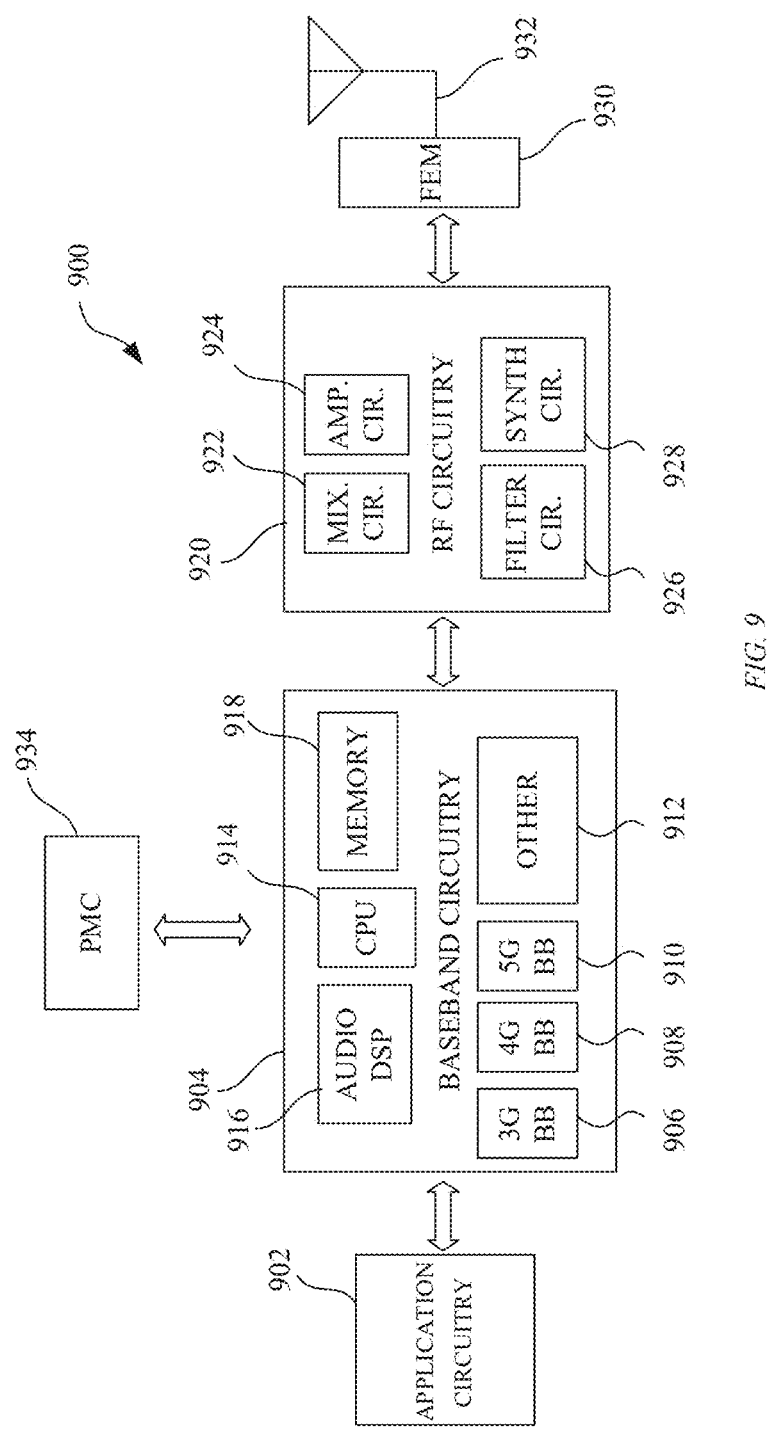
FIG. 9 is block diagram illustrating a UE (either the first UE or second UE) in accordance with some embodiments.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may include passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional —N synthesizer or a fractional N/N+1 synthesizer, although the scope of the embodiments is not limited in this respect as other types of frequency synthesizers may be suitable. For example, synthesizer circuitry

928 may be a delta-sigma synthesizer, a frequency multiplier, or a synthesizer including a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in an EGE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 10:
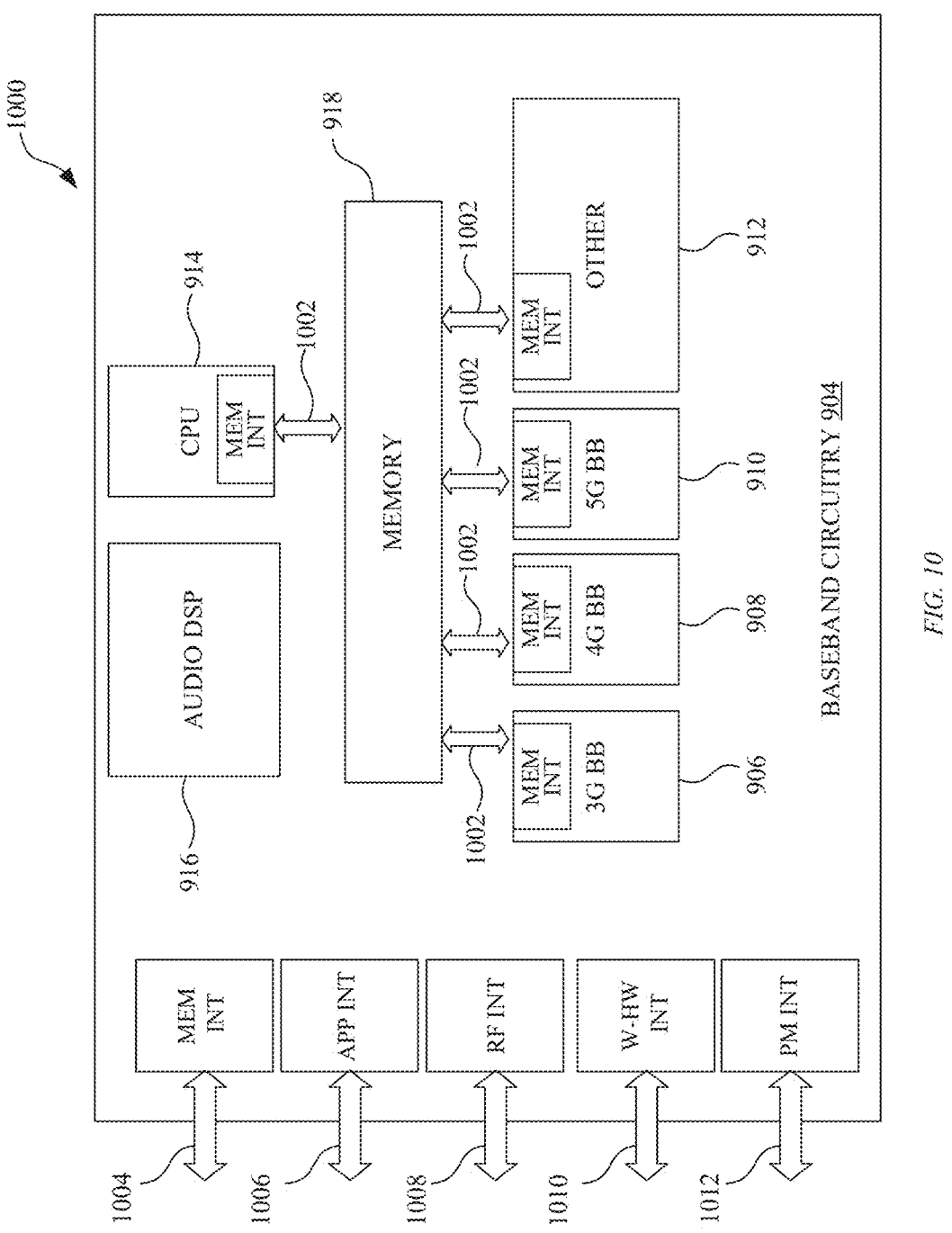
FIG. 10 illustrates example interfaces of baseband circuitry in the UE of FIG. 7 in accordance with some embodiments.

FIG. 10 illustrates example interfaces 1000 of baseband circuitry in accordance with some embodiments. As discussed above, the baseband circuitry 904 of FIG. 9 may include 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
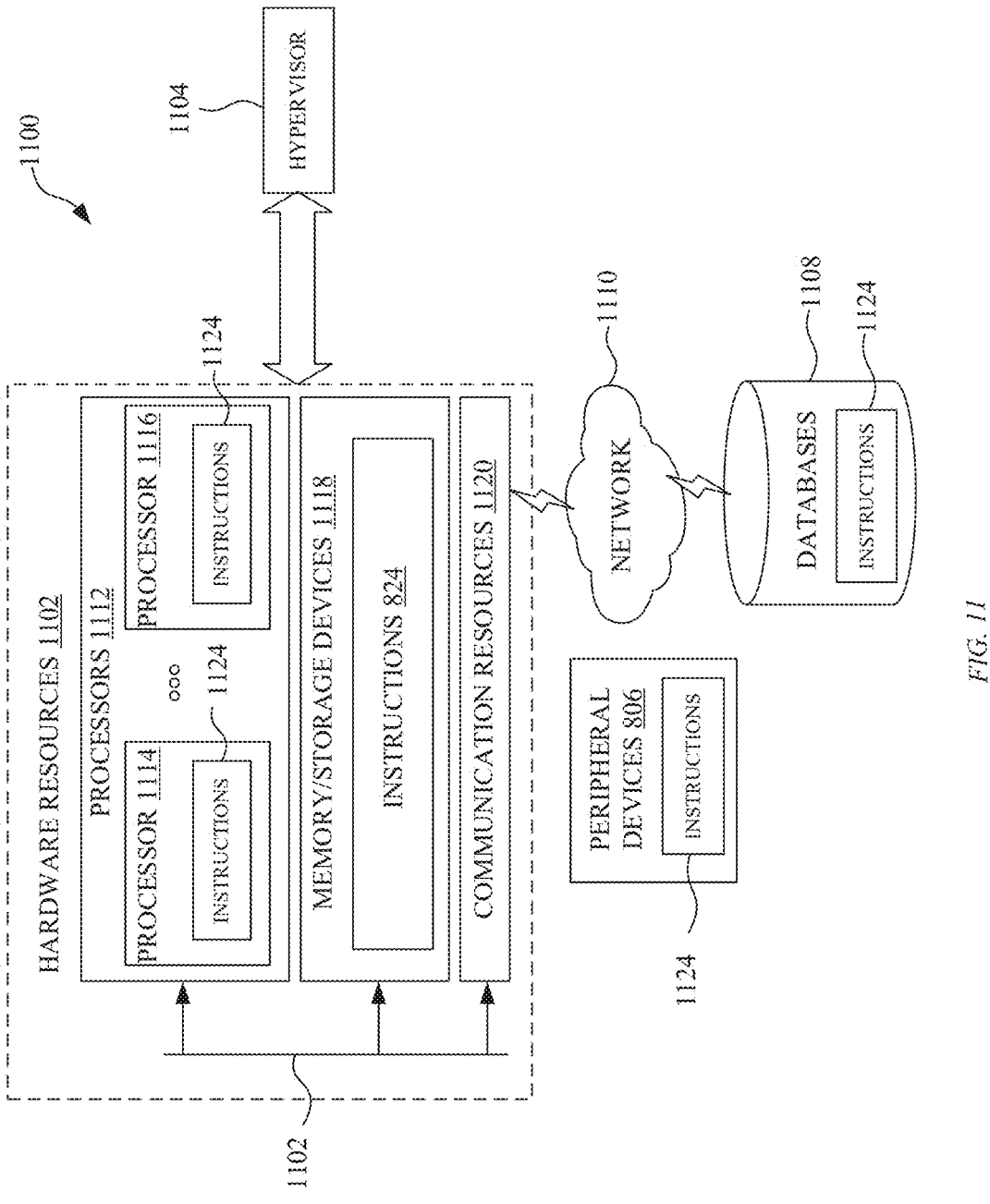
FIG. 11 illustrates components in accordance with some embodiments.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may include software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1. A method for a user equipment (UE), including: causing, at a first user equipment (UE), transmission of at least one positioning reference signal (PRS) to a second UE via a sidelink (SL) communication based on first positioning assistance data, wherein the transmission enables the second UE to determine positioning measurements from at least part of the at least one PRS.

Example 2. The method of Example 1, further including: determining, at the first UE, at least part of the first positioning assistance data; and causing, at the first UE, transmission of the at least part of the first positioning assistance data to the second UE.

Example 3. The method of Example 2, wherein at least one PRS and the at least part of the first positioning assistance data are transmitted from the first UE to the second UE in a same SL carrier frequency band.

Example 4. The method of Example 2, wherein the at least one PRS is transmitted from the first UE to the second UE in a second SL carrier frequency band different from a first SL carrier frequency band for the transmission of the at least part of the first positioning assistance data.

Example 5. The method of Example 4, wherein the first SL carrier frequency band includes frequency range one (FR1), and wherein the second SL carrier frequency band includes frequency range two (FR2).

Example 6. The method of Example 1, wherein the first UE is within radio coverage of a base station, the method further including: obtaining, at the first UE, the first positioning assistance data from the base station.

Example 7. The method of Example 6, wherein the second UE is out of radio coverage of the base station, the method further including: causing, at the first UE, transmission of the first positioning assistance data to the second UE.

Example 8. The method of Example 1, wherein the first UE is pre-configured with at least part of the first positioning assistance data by at least one of a network operator or a manufacturer of the first UE.

Example 9. The method of any of Examples 1-8, wherein the first positioning assistance data includes at least one selected from a group consisting of: one or more parameters related to availability of the at least one PRS; one or more parameters to identify a carrier frequency for the transmission of the at least one PRS; one or more parameters to identify one or more resource pools for transmission/receipt of the at least one PRS; one or more parameters to describe how one or more resources are organized in the one or more resource pools; one or more parameters to identify each resource for transmission/receipt of the at least one PRS; one or more parameters to define how each transmission of the at least one PRS uses the resources; one or more parameters related to how the at least one PRS is repeated in time domain; one or more parameters to identify one or more transmitters of the at least one PRS; and one or more parameters to identify a transmission mode for the transmission of the at least one PRS.

Example 10. The method of Example 9, wherein the transmission mode includes one selected from a group consisting of: a periodic mode in which the at least one PRS is transmitted periodically; a one-shot mode in which the at least one PRS is transmitted in one shot at a designated time; and a semi-persistent mode in which the first UE informs the second UE to activate and deactivate a predetermined configuration for receipt of the at least one PRS.

Example 11. The method of Example 9, wherein the at least one PRS includes a plurality of directional beams, and wherein the first positioning assistance data further includes one or more beam-related parameters for transmission/receipt of the at least one PRS to enable beam-level measurement of the at least one PRS by the second UE.

Example 12. The method of any of Examples 1 to 11, further comprising: performing, at the first UE, at least one selected from a group consisting of: causing transmission of second positioning assistance data associated with the first UE to the second UE for positioning of the second UE; and obtaining, from the second UE, the positioning measurements and second positioning assistance data associated with the second UE for positioning of the first UE.

Example 13. The method of Example 12, wherein the second positioning assistance data associated with the first UE is transmitted from the first UE to the second UE in a same SL carrier frequency band as the at least one PRS.

Example 14. The method of Example 12, wherein the second positioning assistance data associated with the second UE is transmitted from the second UE to the first UE in the same SL carrier frequency band as the at least one PRS.

Example 15. The method of Example 12, wherein the second positioning assistance data associated with the first UE is transmitted from the first UE to the second UE in a same SL carrier frequency band as the at least part of the first positioning assistance data.

Example 16. The method of Example 12, wherein the second positioning assistance data associated with the second UE is transmitted from the second UE to the first UE in the first SL carrier frequency band as the at least part of the first positioning assistance data.

Example 17. The method of Example 12, wherein the at least part of the first positioning assistance data and the second positioning assistance data associated with the first UE are transmitted from the first UE to the second UE in a same message.

Example 18. The method of Example 12, wherein the at least part of the first positioning assistance data and the second positioning assistance data associated with the first UE are transmitted from the first UE to the second UE in separate messages.

Example 19. The method of Example 12, wherein the second positioning assistance data associated with the first UE includes a location and speed of the first UE when transmitting the at least one PRS.

Example 20. The method of Example 12, wherein the second positioning assistance data associated with the second UE includes a location and a speed of the second UE when determining the positioning measurements.

Example 21. A method, including: obtaining, at a second user equipment (UE), at least one positioning reference signal (PRS) from a first UE via a sidelink communication based on first positioning assistance data; and determining, at the second UE, positioning measurements from at least part of the at least one PRS.

Example 22. The method of Example 21, further comprising: performing, at the second UE, at least one selected from a group consisting of: obtaining, from the first UE, second positioning assistance data associated with the first UE for positioning of the second UE; and causing transmission of the positioning measurements and second positioning assistance data associated with the second UE to the first UE for positioning of the first UE.

Example 23. The method of Example 21 or 22, further including: determining, at the second UE, a position of the second UE relative to the first UE from the positioning measurements.

Example 24. The method of Example 22, further including: determining, at the second UE, a position of the second UE relative to the first UE from the positioning measurements; and determining, at the second UE, a refined relative position or an absolute position of the second UE from the determined position of the second UE and the obtained second positioning assistance data associated with the first UE.

Example 25. The method of any of Examples 21 to 24, wherein the positioning measurements include at least one selected from a group consisting of: time of arrival of at least part of the at least one PRS; and signal strength of at least part of the at least one PRS.

Example 26. An apparatus for a user equipment (UE), the apparatus including: one or more processors configured to perform steps of the method according to any of Examples 1-25.

Example 27. A computer readable medium having computer programs stored thereon which, when executed by one or more processors, cause an apparatus to perform steps of the method according to any of Examples 1-25.

Example 28. An apparatus for a communication device, including means for performing steps of the method according to any of Examples 1-25.

Example 29. A computer program product including computer programs which, when executed by one or more processors, cause an apparatus to perform steps of the method according to any of Examples 1-25.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method comprising:

generating, at a first user equipment (UE), a positioning reference signal (PRS) for transmission to a second UE via a sidelink (SL) communication, wherein the PRS is to enable the second UE to determine a positioning measurement; and generating positioning assistance data for transmission to the second UE via a PC5 message, the generated positioning assistance data to indicate an absolute location of the first UE that transmits the PRS, wherein the indicated absolute location is based on location information indicative of an absolute location of the second UE and a calculated relative position between the first UE and the second UE.

2. The method of claim 1, wherein the PRS and the positioning assistance data are to be transmitted in a same SL carrier frequency band.

3. The method of claim 1, wherein the positioning assistance data is to be transmitted in a first SL carrier frequency band; and the PRS is to be transmitted in a second SL carrier frequency band that is different from the first SL carrier frequency band.

4. The method of claim 3, wherein the first SL carrier frequency band comprises frequency range one (FR1), and wherein the second SL carrier frequency band comprises frequency range two (FR2).

5. The method of claim 1, wherein:

the PRS comprises a plurality of directional beams; and the positioning assistance data includes one or more beam-related parameters for receiving the PRS to enable beam-level measurement of the PRS by the second UE.

6. The method of claim 1, wherein the positioning assistance data further comprises a speed of the first UE that transmits the PRS.

7. The method of claim 1, wherein the positioning assistance data is first positioning assistance data, and wherein the method further comprises:

obtaining, from the second UE, the positioning measurement and second positioning assistance data associated with the second UE for positioning of the first UE, wherein the second positioning assistance data is transmitted in: a same SL carrier frequency band as the PRS; or a same SL carrier frequency band as the first positioning assistance data.

8. The method of claim 7, wherein the second positioning assistance data comprises a location of the second UE.

9. The method of claim 1, the method further comprising identifying PRS assistance information associated with the at least one PRS, wherein the PRS is to be transmitted based on the PRS assistance information.

10. The method of claim 9, wherein the first UE is within radio coverage of a base station and the second UE is out of radio coverage of the base station, and wherein the method further comprises:

obtaining PRS assistance information from the base station; and outputting the PRS assistance information for transmission to the second UE.

11. The method of claim 9, further comprising accessing pre-configured information that includes at least part of the positioning assistance information.

12. The method of claim 9, wherein the PRS assistance information comprises one or more parameters: related to availability of the PRS; that identify a carrier frequency for transmitting the PRS; that identify one or more resource pools for transmitting the PRS; that describe how one or more resources are organized in one or more resource pools for transmitting the PRS; that identify each resource for transmitting the PRS; that define how each transmission of the at least one PRS uses resources; related to how the PRS is repeated in time domain; that identify one or more transmitters of the PRS; or that identify a transmission mode for transmitting the PRS.

13. The method of claim 9, wherein the PRS assistance information comprises one or more parameters to identify a transmission mode for transmitting the PRS, the transmission mode being a periodic mode in which the PRS is transmitted periodically; a one-shot mode in which the PRS is transmitted in one shot at a designated time;

or a semi-persistent mode in which the first UE informs the second UE to activate and deactivate a predetermined configuration for receipt of the PRS.

14. One or more non-transitory computer-readable media having instructions that, when executed, cause processing circuitry to:

obtain at least one positioning reference signal (PRS) from a first user equipment (UE) via a sidelink communication;

receive, from the first UE via a PC5 message, positioning assistance data associated with the first UE for positioning of a device, the positioning assistance data to indicate an absolute location of the first UE, wherein the indicated absolute location is based on location information indicative of an absolute location of a second UE and a calculated relative position between the first UE and the second UE; and determine positioning measurements based on the at least one PRS and the positioning assistance data.

15. The one or more non-transitory computer-readable media of claim 14, wherein the positioning assistance data is first positioning assistance data, and wherein the instructions, when executed, further cause the processing circuitry to:

cause transmission of the positioning measurements and second positioning assistance data associated with the second UE to the first UE for positioning of the UE, wherein the second positioning assistance data indicates an absolute location of the second UE based on the indicated absolute location of the first UE and the positioning measurements.

16. The one or more non-transitory computer-readable media of claim 14, wherein the positioning measurements are based on time of arrival, angle of arrival, or signal strength.

17. The one or more non-transitory computer-readable media of claim 14, wherein the instructions, when executed, further cause the processing circuitry to:

determine a position of the second UE relative to the first UE based on the positioning measurements; and determine the absolute location of the second UE based on the determined position of the second UE and the positioning assistance data associated with the first UE.

18. The one or more non-transitory, computer-readable media of claim 14, wherein the at least one PRS is obtained in a Third Generation Partnership Project (3GPP) frequency range 1 (FR1) and the positioning assistance data is received in a 3GPP frequency range 2 (FR2).

19. An apparatus comprising:

processing circuitry to:

generate, at a first user equipment (UE), a positioning reference signal (PRS) for transmission to a second UE via a sidelink (SL) communication, wherein the PRS is to enable the second UE to determine a positioning measurement; and generate positioning assistance data for transmission to the first UE in a PC5 message, the generated positioning assistance data to indicate an absolute location of the first UE that transmits the PRS, wherein the indicated absolute location is based on location information indicative of an absolute location of the second UE and a calculated relative position between the first UE and the second UE; and interface circuitry coupled to the processing circuitry to enable communication.

20. The apparatus of claim 19, wherein the PRS is to be transmitted in a Third Generation Partnership Project (3GPP) frequency range 2 (FR2) and the positioning assistance data is to be transmitted in a 3GPP frequency range 1 (FR1).

* * * * *